(12) United States Patent
Moon et al.

(10) Patent No.: US 11,787,974 B2
(45) Date of Patent: Oct. 17, 2023

(54) CHEMICAL-MECHANICAL POLISHING PARTICLE AND POLISHING SLURRY COMPOSITION COMPRISING SAME

(71) Applicant: Dongjin Semichem Co., Ltd., Incheon (KR)

(72) Inventors: Weoun Gyuen Moon, Hwaseong-si (KR); Jae Hyun Kim, Hwaseong-si (KR); Kyu Soon Shin, Hwaseong-si (KR); Jong Dai Park, Hwaseong-si (KR); Min Gun Lee, Hwaseong-si (KR); Sung Hoon Jin, Hwaseong-si (KR); Goo Hwa Lee, Hwaseong-si (KR); Gyeong Sook Cho, Hwaseong-si (KR); Jae Hong Yoo, Hwaseong-si (KR)

(73) Assignee: Dongjin Semichem Co., Ltd., Incheon (KR)

( * ) Notice: Subject to any disclaimer, the term of this patent is extended or adjusted under 35 U.S.C. 154(b) by 0 days.

(21) Appl. No.: 17/363,105

(22) Filed: Jun. 30, 2021

(65) Prior Publication Data

US 2021/0340405 A1    Nov. 4, 2021

Related U.S. Application Data

(63) Continuation of application No. PCT/KR2019/018546, filed on Dec. 27, 2019.

(30) Foreign Application Priority Data

Dec. 31, 2018   (KR) .................. 10-2018-0173796

(51) Int. Cl.
*C09G 1/02* (2006.01)
*C09K 3/14* (2006.01)

(52) U.S. Cl.
CPC .............. *C09G 1/02* (2013.01); *C09K 3/1436* (2013.01)

(58) Field of Classification Search
None
See application file for complete search history.

(56) References Cited

U.S. PATENT DOCUMENTS

| | | | | |
|---|---|---|---|---|
| 8,007,759 B2* | 8/2011 | Deschaume | ............... | C01F 7/56 423/112 |
| 2006/0255015 A1* | 11/2006 | Siddiqui | ............. | H01L 21/3212 438/692 |
| 2018/0155203 A1* | 6/2018 | Lin | .......................... | B01J 20/18 |

* cited by examiner

*Primary Examiner* — Stephanie P Duclair
(74) *Attorney, Agent, or Firm* — United One Law Group LLC; Kongsik Kim; Jhongwoo Peck

(57) ABSTRACT

The present disclosure provides chemical-mechanical polishing (CMP) particles exhibiting a high polishing rate and a high polishing quality of generating few defects or scratches due to their modified surface thereof. The present disclosure also provides a polishing slurry composition including the polishing particles.

9 Claims, 4 Drawing Sheets

US 11,787,974 B2

CHEMICAL-MECHANICAL POLISHING PARTICLE AND POLISHING SLURRY COMPOSITION COMPRISING SAME

CROSS-REFERENCE TO RELATED APPLICATIONS

The present application is a continuation application of International Application No. PCT/KR2019/018546 filed on Dec. 27, 2019, which claims priority to Korea Application No. 10-2018-0173796 filed on Dec. 31, 2018. The applications are incorporated herein by reference.

TECHNICAL FIELD

The present disclosure relates to chemical-mechanical polishing particles and a polishing slurry composition including the same.

BACKGROUND ART

In the manufacture of integrated circuits and other electronic devices, multiple layers of conductive, semiconductive, and dielectric materials are deposited on or removed from a substrate surface. As layers of materials are sequentially deposited on or removed from the substrate, the top surface of the substrate may become non-planar and require planarization. To planarize or "polish" a surface is the process of removing a material from the surface of a substrate to form a generally even, planar surface. Planarization is useful for removing unwanted surface topography and surface defects such as rough surfaces, agglomerated materials, crystal lattice damage, scratches, and contaminated layers or materials. Planarization is also useful for forming features on a substrate by removing over-deposited material that is used to fill the features and provide a smooth surface for subsequent metallization and leveling processes.

Compositions and methods for planarizing or polishing the surface of a substrate are well known in the art. Chemical-mechanical planarization or chemical-mechanical polishing (CMP) is a common technique used to planarize a substrate. CMP uses a chemical composition known as a CMP composition, or more simply, a polishing composition (also referred to as a polishing slurry) to selectively remove a material from a substrate. The polishing composition is typically applied to a substrate by contacting the surface of the substrate with a polishing pad (e.g., an abrasive cloth or abrasive disk) saturated with the polishing composition. The polishing of the substrate is typically further aided by the chemical activity of the polishing composition and/or the mechanical activity of the polishing particles suspended in the polishing composition or incorporated into the polishing pad.

A polishing composition can be characterized according to its polishing rate (i.e., removal rate) and its planarization efficiency. The polishing rate refers to the rate at which a material is removed from the surface of a substrate, and is usually expressed in length (thickness) per unit time (e.g., angstroms (Å) per minute). The planarization efficiency is related to the reduction of the step relative to the amount of material removed from the substrate.

SUMMARY OF DISCLOSURE

An objective of the present disclosure is to provide a polishing slurry composition capable of producing strong electric charges by modifying the surface of polishing particles under mild conditions.

Another objective of the present disclosure is to provide chemical-mechanical polishing particles, which provide a higher polishing rate and higher polishing quality with few defects or scratches, and a polishing slurry composition including the same.

A further objective of the present disclosure is to provide chemical-mechanical polishing particles that are less affected by the type and physical properties thereof and have excellent polishing properties corresponding to surface modification, and a polishing slurry composition including the same.

A further objective of the present disclosure is to provide chemical-mechanical polishing particles having a higher polishing rate even at a low content by increasing the chemical and physical bonding strength with a polishing film due to an increase in the number of —OH sites and the positive charges on the surface, and a polishing slurry composition including the same.

However, the objectives of the present disclosure are not limited to the above-mentioned objectives, and other objectives not mentioned will be clearly understood by those skilled in the art from the following description.

In order to achieve the above objectives, according to one aspect of the present disclosure, there are provided chemical-mechanical polishing particles including base polishing particles and at least one aluminum cluster on the surface of each of the polishing particles. The number of pKa peaks of the polishing particles, which may be obtained by a back titration method, is one or more. At least one of pKa values of the peaks may range from 4.3 to 4.9.

The number of the peaks may be 3, and a peak having the highest pKa value among the three peaks may have the greatest peak area.

The chemical-mechanical polishing particles may have a zeta potential of 40 mV or more. The polishing particles may include silica particles. The at least one aluminum cluster may include one or more of $[Al(OH)]^{2+}$, $[Al(OH)_2]^+$, $[Al_2(OH)_2(H_2O)_8]^{4+}$, $[Al_{13}O_4(OH)_{24}(H_2O)_{12}]^{7+}$, and $[Al_2O_8Al_{28}(OH)_{56}(H_2O)_{26}]^{18+}$.

In another aspect of the present disclosure, there is provided a polishing slurry composition including the chemical-mechanical polishing particles, a pH adjuster, and water. The chemical-mechanical polishing particles may be present in the slurry composition in an amount of 0.2 wt % to 10 wt %. The slurry composition may further include an oxidizing agent, an iron-containing catalyst, or the like.

According to embodiments of the present disclosure, the surfaces of the polishing particles and polishing slurry composition can be modified under mild conditions so that the polishing particles and polishing slurry composition can be strongly electrically charged, provide a higher polishing rate and polishing quality with few defects or scratches, and exhibit a high polishing selectivity.

Further, the polishing particles and polishing slurry composition can be less affected by the type and physical properties thereof and have excellent polishing properties due to the surface modification.

Further, the polishing particles and polishing slurry composition can have a higher polishing rate even at a low content by increasing the chemical and physical bonding strength with a polishing film due to an increase in the number of —OH sites and the positive charges on the surface.

The above and other effects will be described in detail below.

DETAILED DESCRIPTION

Before describing the present invention in detail, it is noted that terms used herein are only for the purpose of describing specific embodiments and are not intended to limit the scope of the present disclosure that is only defined by the Claims. Unless otherwise described, all terms including technical and scientific terms used herein have the same meaning as commonly understood by those skilled in the art.

It is noted that the terms "comprise", "comprises", and "comprising" used throughout the specification and the claims are intended to cover non-exclusive inclusions of stated objects, steps, groups of objects, and groups of steps except as otherwise described.

In addition, several embodiments of the present disclosure may be combined with any other embodiments except as otherwise described. Hereinafter, embodiments of the present disclosure as well as effects thereof will be described. Chemical-mechanical polishing particles according to an embodiment of the present disclosure include base polishing particles and at least one aluminum (Al) cluster provided on the surface of each of the polishing particles. For example, the Al cluster may form a coating layer(s) on a portion(s) or the entirety of the surface of the polishing particles. The form of the coating layer is not limited, and it may be realized by, for example, covalent bonding (e.g., condensation bonding between the hydroxyl group of the polishing particles and the hydroxyl group of the Al cluster), ion bonding, or physical bonding between the polishing particles and the Al cluster.

An example of a method of coating polishing particles with an Al cluster includes: a step of preparing an aqueous dispersion by dispersing an Al compound and polishing particles into water and a step of modifying the aqueous dispersion into polishing particles coated with Al cluster by reaction by stirring the aqueous dispersion. Water may be deionized water. The aqueous dispersion in which the polishing particles are dispersed may be prepared by preparing a solution by adding the Al compound into deionized water and adding the polishing particles into the solution. Here, the aqueous dispersion includes not only a form in which the polishing particles are uniformly dispersed in water but also a form in which the polishing particles are non-uniformly dispersed in water.

Here, it is important to adjust the pH of the modification reaction to be in the range of 3.0 to 5.7. In particular, the pH of the modification reaction may be in the range of 4.0 to 5.5 (refer to following Examples). It is estimated that different types of Al clusters may be produced and the organic and microscopic bonding structure between the surface of the polishing particles and the Al clusters may vary depending on the pH value of the modification reaction. Thus, the pH value of the modification reaction has a significant effect on the polishing rate.

Figure 1:
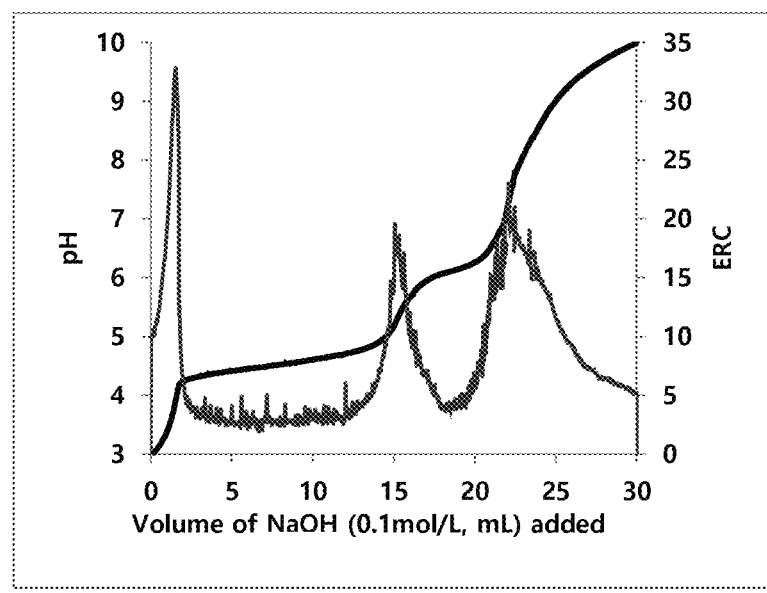
FIG. 1 is a diagram of a back titration curve of Example 20 of the present disclosure.
Figure 2:
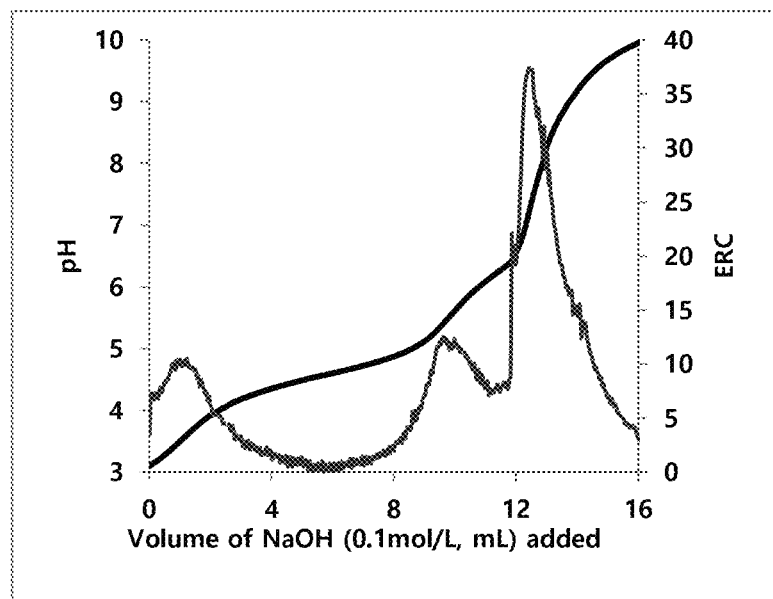
FIG. 2 is a diagram of a back titration curve of Example 21 of the present disclosure.

The chemical-mechanical polishing particles according to an embodiment of the present disclosure produced in this manner are characterized in that the number of pKa peaks obtained by a back titration method is one or more (see FIGS. 1 and 2).

The back titration method may be specifically carried out as follows: first, a primary acidic treatment is performed so that the surface of the chemical-mechanical polishing particles has an acidic atmosphere. After the first acidic treatment, stirring is performed for a predetermined time period for stabilization. Afterwards, back titration is performed by dropping a base, thereby obtaining a pH change graph. A differential graph is obtained by differentiating the pH change graph. The number of peaks on the differential graph, the pHs of the peaks, the surface charge density, the surface OH group density, and the like are obtained by analyzing the obtained graph.

A more specific illustration may be a back titration method described in the following Examples.

As seen from the following Examples and FIGS. 1 and 2, it may be observed that the Examples of the present disclosure having one or more pKa peaks have significantly superior polishing rates and the like compared to Comparative Examples.

The chemical-mechanical polishing particles according to an embodiment of the present disclosure are characterized in that the pKa value of at least one peak of the peaks is in the range of 4.3 to 4.9. In this case, the Al cluster includes an $Al_{13}$ form. Thus, a high polishing rate may be obtained even at a low content of the polishing particles, and the low density of the polishing particles may assist in the improvement of the surface quality of an object to be polished.

The chemical-mechanical polishing particles according to an embodiment of the present disclosure may be characterized in that the number of the peaks is 3, the pKa value of one of the three peaks is in the range of 3.0 to 3.5, and the pKa values of the remaining two of the three peaks are in the range of 4.3 to 4.9 (see Table 15).

In addition, the peak having the highest pKa value among the peaks is characterized by having the greatest peak area (see FIGS. 1 and 2). The pKa peak having the greatest peak area may be in the range of 4.3 to 4.9. In this case, $Al_{13}$ forms or Al hydroxide forms among the Al clusters on the surface of the modified polishing particles may be increased, thereby increasing the polishing rate.

In the pH graph of the chemical-mechanical polishing particles according to an embodiment of the present disclosure, when the number of the peaks is 3, the first peak among the three peaks occurs in the range of pH of 3 to 4.5, the second peak among the three peaks occurs in the range of pH of 4.5 to 6, and the third peak among the three peaks occurs in the range of pH of 6 so 8 (see FIGS. 1 and 2).

The characteristics of the pH change graph derived from the above-described test method, as well as the characteristics of the pKa values and the differential graph of the pH change graph, represent the characteristic structure of the polishing particles surface-modified with the Al cluster(s) according to the present disclosure. The characteristics show that the surface structure of the polishing particles according to the present disclosure is significantly different from that of particles of Comparative Examples.

In addition, the zeta potential of the chemical-mechanical polishing particles according to an embodiment of the present disclosure is significantly improved due to the introduction of the Al cluster(s) and serves as another factor to improve the polishing performance. The zeta potential of the chemical-mechanical polishing particles according to an embodiment of the present disclosure may be 20 mV or more. Referring to the following Examples, the polishing rate was significantly increased when the zeta potential was, in particular, 40 mV or more.

The Al clusters include, but are not limited to, a cationic complex containing Al. Considering the behavior of the pH change graph and the pKa values described above, two or more types of Al clusters may be included. As the Al clusters, in particular, one or more cationic complex structures among $[Al(OH)]^{2+}$, $[Al(OH)_2]^+$, $[Al_2(OH)_2(H_2O)_8]^{4+}$, $[Al_{13}O_4(OH)_{24}(H_2O)_{12}]^{7+}$, and $[Al_2O_8Al_{28}(OH)_{56}(H_2O)_{26}]^{18+}$ may be included. When two or more types of Al cluster cationic complexes are included, the polishing performance may be significantly improved. Examples of the counter anion of the cationic complex may include, but are not limited to, $Cl^-$, $SO_4^{2-}$, $NO_3^-P^-$, and the like.

Types of the polishing particles are not limited. For example, types of the polishing particles may include alumina, ceria, titania, zirconia, silica, and the like. Silica may be included, since the surface thereof is thermodynamically stable and thus the surface modification thereof is easily accomplished due to strong adsorption or covalent bonding. Types of silica may include colloidal silica, fumed silica, and the like.

The Al compound used for coating with the Al cluster is not limited as long as the Al compound may realize the objective of the present disclosure. For example, the Al compound to be used may be at least one selected from aluminum chloride, aluminum sulfate, ammonium aluminum sulfate, aluminum potassium sulfate, aluminum nitrate, trimethylaluminum, and aluminum phosphide.

The application content of the Al compound may be in, but is not limited to, the range of 0.05 wt % to 3 wt %, and more particularly, 1 wt % to 3 wt %. Below this range, the improvement of the polishing rate is insignificant. Above this range, the viscosity of a polishing composition may be increased and agglomeration may occur.

A pH adjuster for adjusting the pH of the modification reaction is not limited. One or more pH adjusters to be used may be selected. Examples of the pH adjuster may include acidic adjusters, such as nitric acid, hydrochloric acid, sulfuric acid, acetic acid, formic acid, and citric acid, and basic adjusters, such as potassium hydroxide, sodium hydroxide, tetramethyl ammonium hydroxide, and tetrabutyl ammonium hydroxide. The pH adjuster may be used for pH control in the modification reaction, and it may be used to adjust the pH of a final polishing composition in accordance with the polishing process.

Another embodiment of the present disclosure provides a polishing composition including the chemical-mechanical polishing particles surface-modified with the Al cluster as described above, a pH adjuster, and water. The chemical-mechanical polishing particles may be in the range of 0.1 wt % to 10 wt %. Below this range, the polishing performance may be reduced. Above this range, the quality of the polishing may be degraded due to increased crystals and scratches on the layer to be polished.

The pH adjuster may be the above-described pH adjuster. The final pH of the polishing composition is not limited. The final pH of the polishing composition may be in the range of 3.0 to 5.7, i.e., the same as the pH range of the modification reaction described above. Particularly, the pH may be in the range of 4.0 to 5.5.

The polishing composition according to an embodiment of the present disclosure may further include a variety of additives for performance improvement.

Specifically, a biocide may be included to prevent microbial contamination. Examples of the biocide may include isothiazolinone or derivatives thereof, methylisothiazolinone (MIT or MI), chloromethylisothiazolinone (CMIT, CMI, or MCI), benzisothiazolinone (BIT), octylisothiazolinone (OIT or OI), dichlorooctylisothiazolinone (DCOIT or DCOI), butylbenzisothiazolinone (BBIT), polyhexamethylene guanidine (PHMG), and the like. The content of the biocide added may be in, but is not limited to, the range of 0.0001 wt % to 0.05 wt %, and particularly, 0.005 wt % to 0.03 wt %.

In addition, an oxidizer, a catalyst, a dispersion stabilizer, a polishing profile improving agent, a surface quality improving agent, and the like may be included.

The oxidizer may be implemented as an inorganic or organic per-compound. The per-compound is a compound including at least one peroxy group (—O—O—) or a compound including an element in the highest oxidation state. Examples of the per-compound including at least one peroxy group may include, but are not limited to, hydrogen peroxide and additives thereof, such as urea hydrogen peroxide and percarbonate, organic peroxides, benzoyl peroxides, peracetic acids, and di-tert-butyl peroxides, monopersulfates ($SO_5^=$), dipersulfates ($S_2O_8^=$), and sodium peroxide. Specifically, the oxidizer may be hydrogen peroxide. The application content of the oxidizer may be in the range of 10 ppm to 100,000 ppm, and particularly, 100 ppm to 5,000 ppm. When the object to be polished includes a metal film made from a metal, such as tungsten (W), aluminum (Al), or copper (Cu), the oxidizer may be particularly used. When the content of the oxidizer is excessively low, e.g., below 10 ppm, the polishing rate may be reduced, which is problematic. When the content of the oxidizer exceeds 100,000 ppm, scratches may be formed excessively.

The catalyst may improve the polishing rate of the metal film made from, for example, W. Particularly, the catalyst may be an iron-containing catalyst. More particularly, the catalyst may be made from one or more selected from the group consisting of iron salts, such as iron nitrate and iron chloride, and nano ferrosilicon (FeSi). The content of the catalyst may be in the range of 0.00001 wt % to 1 wt %, and particularly, 0.0001 wt % to 0.5 wt % with respect to the total weight of a slurry composition. When the content of the catalyst is excessively low, e.g., 0.00001 wt %, the polishing rate of the metal film may be reduced, which is problematic. When the content of the catalyst exceeds 1 wt %, chemical reactivity is excessive and thus the polishing rate is non-uniform, which is problematic.

The dispersion stabilizer may be implemented as a combination of sodium acetate and acetic acid, a combination of sodium sulfate and sulfuric acid, citric acid, glycine, imidazole, potassium phosphate, or the like. In particular, the combination of sodium acetate and acetic acid and the combination of sodium sulfate and sulfuric acid have superior pH stability due to the presence of a conjugate acid and a conjugate base, and thus, are advantageous to maintain dispersibility. The application content of the dispersion stabilizer may be in the range of 500 ppm to 8,000 ppm, and particularly, 600 ppm to 5,000 ppm.

The polishing profile improving agent may be included in order to improve the flatness after the polishing of the layer to be polished. Examples of the polishing profile improving agent may include picolinic acid, picoline, dipicolinic acid, pyridine, pipecolic acid, quinolinic acid, and the like. The application content of the polishing profile improving agent may be in the range of 100 ppm to 1,000 ppm.

The surface quality improving agent is an additive intended to reduce defects, scratches, and the like present on a polished wafer. Examples of the surface quality improving agent may include alkyltrimethyl ammonium chloride, dialkyldimethyl ammonium chloride, hexadecyltrimethyl ammonium chloride, alkyl diammonium pentamethyl ammonium chloride, polyethylene glycol, triethylene glycol, diethylene glycol, poly(ethylene glycol)sorbitol hexaoleate, polyoxyethylene sorbitan trioleate, hydroxyethyl cellulose, and the like. The application content of the surface quality improving agent may be in the range of 100 ppm to 1,000 ppm.

The object to be polished by the polishing composition according to an embodiment of the present disclosure is not limited. Examples of the object to be polished may include organic insulation films made from epoxy, acrylate, polyimide, polybenzoxazole, and the like; carbon containing layers, such as spin-on carbon layers, amorphous carbon layers, and the like; metal wires made from Cu, Al, W, and the like; and composite films thereof. In the case of a composite film, simultaneous polishing may be performed. In particular, when the object to be polished is a metal film having a zero (0) surface charge or a negative charge, an organic-inorganic hybrid film, or a polymer film, superior polishing effect may be obtained.

Hereinafter, the present disclosure will be described in detail through Examples.

First, the experimental conditions are as follows.
1) Experiment Wafer: Polyimide 12 inch Blanket
2) Polisher: AP-300 (CTS)
3) Polishing conditions

| Platen Rpm | Head Rpm | IC Pressure psi | RR Pressure psi | EC Pressure psi | UC Pressure psi | Slurry Flow Rate ml/min |
|---|---|---|---|---|---|---|
| 93 | 87 | 3 | 6 | 3 | 3 | 300 |

4) Polishing Pad: IC-1010 (Rohm & Haas)
5) Thickness (polishing speed) measuring equipment
Metal film: CMT-2000 (4-point probe, Changmin Tech.)
Carbon film, organic film: ST-500 (K-MAC)
Polishing rate=Thickness before CMP−Thickness after CMP
6) Particle size analysis equipment
ELS-Z (Otsuka Electronics)
7) pH analysis equipment
Metrohm 704 (Metrohm)
8) Isoelectric point measurement method Each sample for checking the isoelectric point is prepared with an aqueous dispersion of 1% by weight. After adjusting the prepared aqueous dispersion to have pH 2, 3, 4, 5, 6, 7, 8, 9, 10 using 5 wt % of nitric acid ($HNO_3$) and 5 wt % of potassium hydroxide (KOH), respectively, Zeta potentials are analyzed.

The isoelectric point (IEP) is automatically calculated and obtained when the Zeta potential analyzed at each pH is input to the pH analysis of the ELS-Z program.

9) Back titration method

Chemical-mechanical polishing particles are prepared with an aqueous dispersion to have a total surface area of 100 m² based on a solution of 100 ml. Stirring and stabilization are performed until a change in pH of the prepared aqueous dispersion reaches 0.01 mV/min or less. The stabilized aqueous dispersion is primarily treated with an acidic treatment by adding 0.1 molar concentration of nitric acid ($HNO_3$) dropwise to the aqueous solution at a rate of 5 ml/min until the aqueous solution has pH 3. At this time, a change in pH of the aqueous solution is set to 0.5 mV/min or less. After the primary acidic treatment is completed, the stirring and stabilization are performed again until the change in pH of the aqueous solution reaches 0.01 mV/min or less. After the acidic treatment and stabilization, the aqueous dispersion is secondarily treated with a basic titration treatment by adding 0.1 molar concentration of sodium hydroxide (NaOH) dropwise to the aqueous solution at a rate of 5 ml/min until the aqueous solution has pH 10. At this time, the change in pH is set to 0.5 mV/min or less. The stirring speed of all the processes performed above is in the range of 200 to 300 rpm. The base titration graph obtained through the above process has an X-axis indicating the volume of the sodium hydroxide solution added dropwise and a Y-axis indicating the measured pH value, and the obtained pH change graph is differentiated to obtain a differential graph so that the number of peaks on the differential graph, pKa values of the peaks, pH values of the peaks, etc. are measured.

10) Surface —OH group density measurement method

From the base titration graph for each sample, the required amount of 0.1M NaOH (Y[mol]) for the region with no change in the number of $H^+$ and $OH^-$ mols of the titration solution is obtained. Here, the initial amount (X[ml]) of the titration sample is divided by the required amount to obtain [$OH^-$] (A[mol/L]) adsorbed on the surface of each sample. The density of —OH groups present on the surface of each sample is calculated from Equation 1 below.

$$\rho = \frac{(A \cdot N_A)}{S_{BET} \cdot C_p \cdot 10^{18}} \quad \text{[Equation 1]}$$

where $N_A$ [number/mol] is Avogadro's number, $S_{BET}$ [m²/g] is the specific surface area of silica particles, and Cp [g/L] is the concentration of silica particles, respectively.

11) Surface charge density measurement method

From the base titration graph for each sample, the amount of adsorption of 0.1M NaOH (B[mol/L]) on the particle surface according to the pH change is calculated. When the Faraday constant is divided by the adsorption amount of 0.1M NaOH, the surface charge density of the silica particles according to pH can be calculated. The above process can be expressed as Equation 2 below.

$$\sigma H = \frac{F}{S_{BET} \cdot C_p} \cdot B \quad \text{[Equation 2]}$$

where F [C/mol] is the Faraday constant, $S_{BET}$ [m²/g] is the specific surface area of the silica particles, and Cp [g/L] is the concentration of the sample, respectively.

12) Defect measurement method

After chemical-mechanical polishing, the number of defects is measured by observing the defects in the reference area with an electron micrograph (SEM), and the number of defects is calculated in proportion to the entire area of the wafer.

13) Average scratch size measurement method

After chemical-mechanical polishing, the average scratch size is calculated by measuring the size of scratches present in the reference area at a plurality of points with an electron micrograph (SEM) and averaging them.

14) Method of measuring non-uniformity after polishing

Non-uniformity is measured by measuring the removal rate for each point after polishing and by obtaining the standard deviation of the removal rates for points.

15) Rq measurement method

The Rq value after polishing is defined as the root-mean-square (rms) within the reference length of the absolute values of the lengths from the center line to the cross-sectional curve of the surface, and the Rq value is automatically determined by measuring with an atomic force microscope (AFM).

16) Type of silica used

Colloidal silica: TEOS based colloidal silica with pH 7 and average particle size of 79 nm (DLS) is used.

Fumed silica: Fumed silica with pH 4.5 and average particle size of 190 nm (DLS) is used.

EXAMPLES 1 TO 5

After silica and aluminum compounds were added to deionized water (DIW) in the type and content shown in Table 1, a pH adjuster was added as shown in Table 1 for pH control of the reforming reaction. Thereafter, biocide was added as an additive and stirred with a mechanical stirrer for 6 to 24 hours at room temperature and atmospheric pressure to prepare polishing particles and polishing compositions coated with aluminum clusters.

Table 2 shows the solid content, zeta potential, polyimide film removal rate, and pKa of the prepared polishing composition.

COMPARATIVE EXAMPLES 1 TO 3

The same procedure as the above Examples was performed except for the differences shown in Table 1.

TABLE 1

| Items | Polishing Particles | Polishing Particles Content | Al Comp. | Al Comp. Content | pH Adjuster (Content) Biocide (Content) | pH | Notes |
|---|---|---|---|---|---|---|---|
| Comp. Ex. 1 | Coloidal Silica | 1% | — | — | HNO3 (5300 ppm) 1,2-benzisothiazol-3(2H)-one (100 ppm) | 4 | Silica before reforming |
| Comp. Ex. 2 | Coloidal Silica | 1% | Aluminum Chloride (AlCl$_3$) | 1% | KOH (45584 ppm) 1,2-benztsothiazol-3(2H)-one (100 ppm) | 5.8 | Silica after reforming |
| Comp. Ex. 3 | Coloidal Silica | 1% | Aluminum Chloride (AlCl$_3$) | 1% | KOH (53649 ppm) 1,2-benztsothiazol-3(2H)-one (100 ppm) | 7.0 | Silica after reforming |
| Ex. 1 | Coloidal Silica | 1% | Aluminum Chloride (AlCl$_3$) | 1% | HNO3 (50 ppm) KOH (3069 ppm) 1,2-benztsothiazol-3(2H)-one (100 ppm) | 3 | Silica after reforming |
| Ex. 2 | Coloidal Silica | 1% | Aluminum Chloride (AlCl$_3$) | 1% | HNO3 (35 ppm) KOH (6880 ppm) 1,2-benztsothiazol-3(2H)-one (100 ppm) | 3.5 | Silica after reforming |
| Ex. 3 | Coloidal Silica | 1% | Aluminum Chloride (AlCl$_3$) | 1% | KOH (13568 ppm) 1,2-benztsothiazol-3(2H)-one (100 ppm) | 4 | Silica after reforming |
| Ex. 4 | Coloidal Silica | 1% | Aluminum Chloride (AlCl$_3$) | 1% | KOH (20798 ppm) 1,2-benzisothiazol-3(2H)-one (100 ppm) | 4.4 | Silica after reforming |
| Ex. 5 | Coloidal Silica | 1% | Aluminum Chloride (AlCl$_3$) | 1% | KOH (42668 ppm) 1,2-benzisothiazol-3(2H)-one (100 ppm) | 5.5 | Silica after reforming |

TABLE 2

| Items | Polishing Particles | Solids Content | Polyimide Layer Removal Rate | Zeta Potential | pH | pKa |
|---|---|---|---|---|---|---|
| Comp. Ex. 1 | Coloidal Silica | 1% | 76 Å/mmn | −2.5 mV | 4 | 3.22 |
| Comp. Ex. 2 | Coloidal Silica | 2.42% | CMP Impossible | Measurement Impossible | 5.8 | N/A |
| Comp. Ex. 3 | Coloidal Silica | 2.47% | CMP Impossible | Measurement Impossible | 7.0 | N/A |
| Ex. 1 | Coloidal Silica | 2.3% | 1762 Å/min | 35.87 mV | 3 | 3.21/4.42/4.56 |
| Ex. 2 | Coloidal Silica | 2.32% | 1881 Å/min | 47.51 mV | 3.5 | 3.23/4.46/4.52 |
| Ex. 3 | Coloidal Silica | 2.3% | 3684 Å/min | 51.23 mV | 4 | 3.23/4.51/4.81 |
| Ex. 4 | Coloidal Silica | 2.31% | 5014 Å/min | 56.89 mV | 4.4 | 3.24/4.51/4.61 |
| Ex. 5 | Coloidal Silica | 2.44% | 5314 Å/min | 62.33 mV | 5.5 | 3.28/4.6/4.72 |

As can be seen from the results in Table 2, Examples showed that the zeta potential and the polyimide film removal rate were increased compared to the silica before modification of Comparative Example 1, and the removal rate was remarkably excellent when the pH conditions of the modification reaction were within the range of 4.0 to 5.7. In addition, as the pH condition increased, the zeta potential value increased and the removal rate was excellent. In particular, the zeta potential value was remarkably excellent when it was 40 mV or higher.

On the other hand, when the pH conditions of the reforming reaction were outside the range of one embodiment of the present disclosure (Comparative Examples 2 and 3), the viscosity of the polishing composition rapidly increased and aggregation occurred, so that CMP evaluation and Zeta Potential measurement were impossible.

EXAMPLES 6 TO 10, COMPARATIVE EXAMPLES 1 AND 4 TO 6

The same procedure as in Example 4 was performed except as otherwise indicated in Table 3 below, and the isoelectric point, average particle size at pH 4.2, and polyimide film removal rate and pKa at pH 4.2 were measured, and the results are shown in Table 4.

TABLE 3

| Items | Polishing Particles | Polishing Particles Content | Al Comp. | Al Comp. Content | Notes |
|---|---|---|---|---|---|
| Comp. Ex. 1 | Coloidal Silica | 1% | — | — | Silica before reforming |
| Comp. Ex. 4 | Coloidal Silica | 1% | Aluminum Chloride(AlCl$_3$) | 0.009% | Silica after reforming |
| Comp. Ex. 5 | Coloidal Silica | 1% | Aluminum Chloride(AlCl$_3$) | 4% | Silica after reforming |
| Comp. Ex. 6 | Coloidal Silica | 1% | Aluminum Chloride(AlCl$_3$) | 5% | Silica after reforming |
| Ex. 6 | Coloidal Silica | 1% | Aluminum Chloride(AlCl$_3$) | 0.05% | Silica after reforming |
| Ex. 7 | Coloidal Silica | 1% | Aluminum Chloride(AlCl$_3$) | 0.5% | Silica after reforming |
| Ex. 8 | Coloidal Silica | 1% | Aluminum Chloride(AlCl$_3$) | 1% | Silica after reforming |
| Ex. 9 | Coloidal Silica | 1% | Aluminum Chloride(AlCl$_3$) | 1.5% | Silica after reforming |
| Ex. 10 | Coloidal Silica | 1% | Aluminum Chloride(AlCl$_3$) | 3% | Silica after reforming |

TABLE 4

| Items | Polishing Particles | IEP | Pothole Size (@ pH4.2) | Polyimide Removal Rate (@ pH4.2) | pKa |
|---|---|---|---|---|---|
| Comp. Ex. 1 | Coloidal Silica | 2.97 | 85 nm | 90 Å/min | 3.22 |
| Comp. Ex. 4 | Coloidal Silica | 4.11 | 90 nm | 308 Å/min | 3.24 |
| Comp. Ex. 5 | Coloidal Silica | Measurement Impossible | 800 nm | CMP Impossible | N/A |
| Comp. Ex. 6 | Coloidal Silica | Measurement Impossible | 2080 nm | CMP Impossible | N/A |
| Ex. 6 | Coloidal Silica | 4.78 | 95 nm | 1537 Å/min | 3.27/4.56/4.74 |
| Ex. 7 | Coloidal Silica | 5.41 | 93 nm | 2901 Å/min | 3.25/4.49/4.69 |
| Ex. 8 | Coloidal Silica | 7.53 | 121 nm | 5014 Å/min | 3.24/4.51/4.61 |
| Ex. 9 | Coloidal Silica | 8.72 | 198 nm | 5446 Å/min | 3.24/4.49/4.71 |
| Ex. 10 | Coloidal Silica | 8.94 | 230 nm | 5667 Å/min | 3.23/4.48/4.73 |

As can be seen from the results in Table 4, as the aluminum compound content increased, the particle size of silica after reforming increased compared to the silica before reforming, the isoelectric point increased, and the polyimide film removal rate increased as the aluminum compound content increased. When the aluminum compound content was in the range of 0.5 wt % to 3 wt o, the removal rate was particularly excellent. On the other hand, when the aluminum compound content was 4% or more, aggregation occurred, and measurement was impossible.

EXAMPLES 11 TO 15, COMPARATIVE EXAMPLE 7

The same procedure as in Example 4 was performed except as otherwise indicated in Table 5 below, and the zeta potential, average particle size, defects, polyimide film removal rate, and pKa were measured, and the results are shown in Table 6.

TABLE 5

| Items | Polishing Particles | Polishing Particles Content | Al Comp. | Al Comp. Content | pH | Notes |
|---|---|---|---|---|---|---|
| Ex. 11 | Coloidal Silica | 0.1% | Aluminum Chloride (AlCl$_3$) | 0.3% | 4.68 | Silica after reforming |
| Ex. 12 | Coloidal Silica | 0.2% | Aluminum Chloride (AlCl$_3$) | 0.6% | 4.43 | Silica after reforming |
| Ex. 13 | Coloidal Silica | 1% | Aluminum Chloride (AlCl$_3$) | 3% | 4.58 | Silica after reforming |
| Ex. 14 | Coloidal Silica | 5% | Aluminum Chloride (AlCl$_3$) | 3% | 4.59 | Silica after reforming |
| Ex. 15 | Coloidal Silica | 10% | Aluminum Chloride (AlCl$_3$) | 1% | 4.51 | Silica after reforming |

TABLE 5-continued

| Items | Polishing Particles | Polishing Particles Content | Al Comp. | Al Comp. Content | pH | Notes |
|---|---|---|---|---|---|---|
| Comp. Ex. 7 | Coloidal Silica | 11% | Aluminum Chloride (AlCl$_3$) | 33% | N/A (Measurement Impossible Due to Increased Viscosity) | Silica after reforming |

TABLE 6

| Items | Polishing Particles | Zeta Potential | Av. Particle Size | Defect | Polyimide Removal Rate | pKa |
|---|---|---|---|---|---|---|
| Ex. 11 | Coloidal Silica | 48 mV | 65 nm | 217 ea | 2088 Å/min | 3.25/4.66/4.71 |
| Ex. 12 | Coloidal Silica | 53 mV | 53 nm | 159 ea | 3414 Å/min | 3.24/4.64/4.73 |
| Ex. 13 | Coloidal Silica | 35 mV | 142 nm | 321 ea | 4521 Å/min | 3.28/4.58/4.70 |
| Ex. 14 | Coloidal Silica | 57 mV | 171 nm | 551 ea | 4946 Å/min | 3.24/4.59/4.78 |
| Ex. 15 | Coloidal Silica | 52 mV | 158 nm | 602 ea | 4521 Å/min | 3.26/4.56/4.75 |
| Comp. Ex. 7 | Coloidal Silica | N/A | N/A | N/A | N/A | N/A |

As shown in the results of Table 6, when the content of the modified silica abrasive particles was within the range of one embodiment of the present disclosure, the polyimide film removal rate was excellent and the defects after polishing were significantly reduced, showing excellent polishing quality.

EXAMPLES 16 TO 17, COMPARATIVE EXAMPLE 8

The same procedure as in Example 4 was performed except as otherwise indicated in Table 7 below, and the amorphous carbon film polishing rate and pKa were measured, and the results are shown in Table 8.

TABLE 7

| Items | Polishing Particle | Polishing Particle Content | Al Comp. | Al Comp. Content | pH | Notes |
|---|---|---|---|---|---|---|
| Comp. Ex. 8 | Coloidal Silica | 3% | — | — | 4 | Silica before reforming |
| Ex. 16 | Coloidal Silica | 1% | Aluminum Nitrate (Al(NO$_3$)$_3$) | 3% | 4 | Silica after reforming |
| Ex. 17 | Coloidal Silica | 3% | Aluminum Nitrate (Al(NO$_3$)$_3$) | 3% | 4 | Silica after reforming |

TABLE 8

| Items | Polishing Particle | Polishing Particle Content | Amorphous Carbon Layer Polishing Rate | pH | pKa |
|---|---|---|---|---|---|
| Comp. Ex. 8 | Coloidal Silica | 3% | 10 Å/min | 4 | 3.22 |
| Ex. 16 | Coloidal Silica | 1% | 430 Å/min | 4 | 3.28/4.58/4.70 |
| Ex. 17 | Coloidal Silica | 3% | 469 Å/min | 4 | 3.22/4.51/4.61 |

As shown in the results of Table 8, in the case of Examples 16 and 17, the polishing rate of the amorphous carbon film was significantly superior to that of the silica before modification of Comparative Example 8.

EXAMPLE 18 AND COMPARATIVE EXAMPLE 9

The same procedure as in Example 4 was performed except as otherwise indicated in Table 9 below, and the epoxy film polishing rate, the acrylic film polishing rate, the average scratch size and pKa after polishing were measured, and the results are shown in Table 10.

TABLE 9

| Items | Polishing Particle | Polishing Particle Content | Al Comp. | Al Comp. Content | Primary Particle Size | Notes |
|---|---|---|---|---|---|---|
| Comp. Ex. 9 | Fumed Silica | 2% | — | — | 200 nm | Silica before reforming |
| Ex. 18 | Fumed Silica | 2% | Aluminum Chloride (AlCl$_3$) | 3% | 210 nm | Silica after reforming |

TABLE 10

| Items | Polishing Particle | Polishing Particle Content | Epoxy Polishing Rate | Acryl Polishing Rate | Av. Scratch Size after CMP | pKa |
|---|---|---|---|---|---|---|
| Comp. Ex. 9 | Fumed Silica | 2% | 50 Å/min | 35 Å/min | 20 nm | 6.2 |
| Ex. 18 | Fumed Silica | 2% | 1600 Å/min | 1500 Å/min | 5 nm | 3.27/4.58/4.66 |

As can be seen from the results of Table 10, Example 18 was significantly superior to the polishing rate compared to Comparative Example 9, and it was found that the average scratch size was small.

EXAMPLES 19 TO 22

As compared to Example 4, no biocide was added and the same procedure was performed except as otherwise indicated in Table 11 below, and the surface OH group density of the polishing particles, the surface charge density of the polishing particles, and the polyimide film polishing rate were measured. The results are shown in Table 12.

Figure 4:
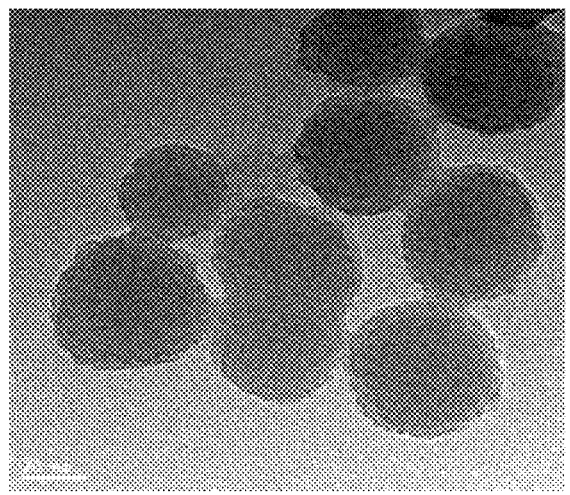
FIG. 4 is a TEM photograph of Example 20 of the present disclosure.

In addition, the chemical-mechanical polishing particles of Examples 19 to 22 were prepared with an aqueous dispersion to have the entire surface area of 100 m² based on a solution of 100 ml, and a pH change graph and a differential graph thereof were obtained by the above-described back titration method, and the results are shown in FIG. 1 (Example 20) and FIG. 2 (Example 21), and the pKa value and the area ratio for each pKa are shown in Table 12. Meanwhile, a TEM photograph of Example 20 is shown in FIG. 4.

COMPARATIVE EXAMPLES 10 TO 12

Figure 3:
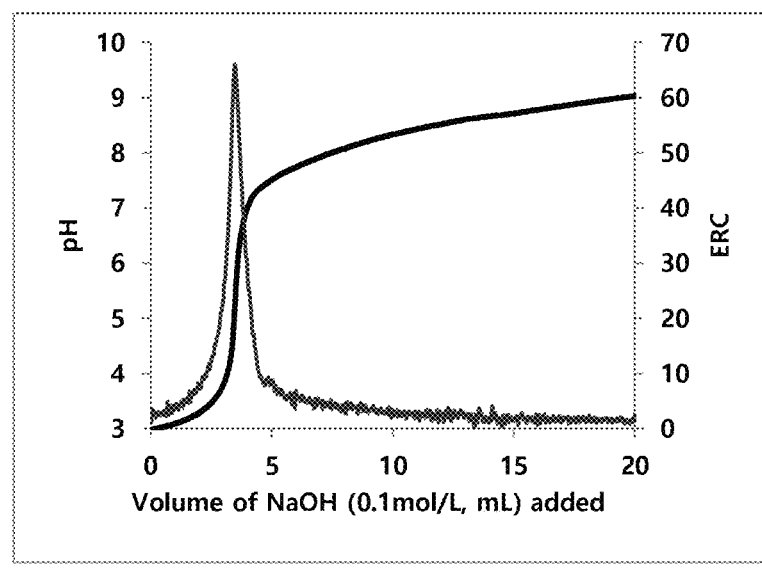
FIG. 3 is a diagram of a back titration curve of Comparative Example 10.
Figure 5:
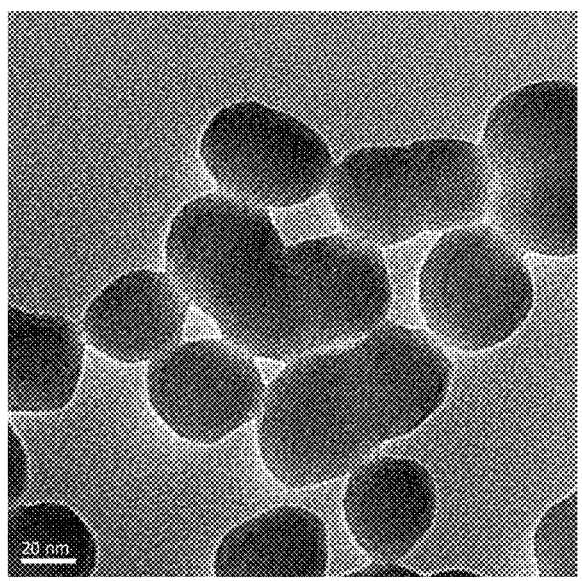
FIG. 5 is a TEM photograph of Comparative Example 10.

The same procedure as in Example 19 was performed except as otherwise indicated in Table 11 below, and the surface OH group density, surface charge density, and polyimide film polishing rate were measured, and the results are shown in Table 12.

results are shown in FIG. 3 (Comparative Example 10) and pKa values are shown in Table 12. On the other hand, the TEM photograph of Comparative Example 10 is shown in FIG. 5.

TABLE 11

| Items | Polishing Particle | Polishing Particle Content | Al Comp. | Al Comp. Content | Notes |
|---|---|---|---|---|---|
| Comp. Ex. 10 | Coloidal Silica | 1% | — | — | Silica before reforming |
| Comp. Ex. 11 | Coloidal Silica | 1% | Aluminum Chloride(AlCl$_3$) | 0.009% | Silica after reforming |
| Comp. Ex. 12 | Coloidal Silica | 1% | Aluminum Chloride(AlCl$_3$) | 4% | Silica after reforming |
| Ex. 19 | Coloidal Silica | 1% | Aluminum Chloride(AlCl$_3$) | 0.05% | Silica after reforming |
| Ex. 20 | Coloidal Silica | 1% | Aluminum Chloride(AlCl$_3$) | 0.5% | Silica after reforming |
| Ex. 21 | Coloidal Silica | 1% | Aluminum Chloride(AlCl$_3$) | 1% | Silica after reforming |
| Ex. 22 | Coloidal Silica | 1% | Aluminum Chloride(AlCl$_3$) | 3% | Silica after reforming |

TABLE 12

| Items | Surface OH-group Density | Surface Charge Density | pKa in Compound | Area ratio for each pKa | Polyimide Layer Removal Rate | Notes |
|---|---|---|---|---|---|---|
| Comp. Ex. 10 | 2.65 Numbers/nm² | 5.83 × 10⁻³ C/m² | 3.22 | 1 | 73 Å/min | — |
| Comp. Ex. 11 | 4.35 Numbers/nm² | 10.51 × 10⁻³ C/m² | 3.24 | 1 | 308 Å/min | — |
| Comp. Ex. 12 | N/A | N/A | N/A | N/A | N/A | Measurement and Evaluation Impossible due to Aggregation |
| Ex. 19 | 6.8 Numbers/nm² | 467 × 10⁻³ C/m² | 3.24/4.54/4.80 | 1:0.96:2.17 | 1582 Å/min | — |
| Ex. 20 | 8.5 Numbers/nm² | 931 × 10⁻³ C/m² | 3.25/4.58/4.70 | 1:0.98:2.34 | 2880 Å/min | — |
| Ex. 21 | 16.1 Numbers/nm² | 4020 × 10⁻³ C/m² | 3.24/4.54/4.63 | 1:1.13:2.42 | 5031 Å/min | — |
| Ex. 22 | 18.6 Numbers/nm² | 6371 × 10⁻³ C/m² | 3.31/4.59/4.74 | 1:1.20:2.64 | 6082 Å/min | — |

In addition, back titration was performed in the same manner as in the back titration method described in Example 19, to obtain a pH change graph and a pH change graph obtained by differentiating the pH change graph, and the As a result of the test, in Examples 19 to 22, the surface OH group density and the surface charge density of the polishing particles were increased and the polishing rate of the polyimide film was increased, compared to Comparative Examples. It is considered that this is because a portion or the entirety of the silica surface is coated with an aluminum cluster (Polynuclear Aluminum Cluster). That is, it is determined that the chemical-mechanical polishing rate is remarkably improved because aluminum clusters, which are nano-level ion clusters with high electric charge, are present on the surface of the polishing particles.

As shown in the TEM photograph of FIG. 4, it is confirmed that about 75% of the silica surface is coated with aluminum clusters, and the coated silica is significantly different from that of the TEM photograph of the uncoated silica of FIG. 5.

EXAMPLES 23 TO 29, COMPARATIVE EXAMPLE 1

The same procedure as in Example 4 was performed except as otherwise indicated in Table 13 below, and the pH change of the slurry composition with time, the polishing rate of the polyimide film, the flatness after polishing, the average roughness (Rq), and the pKa were measured. The results are shown in Table 14.

TABLE 13

| Items | Polishing Particles | Slurry pH (Immediately after manufacture) | Polishing Particles Content | Al Comp. | Al Comp. Content | Additive (Content) |
|---|---|---|---|---|---|---|
| Comp. Ex. 1 | Coloidal Silica | 4 | 1% | — | — | — |
| Ex. 23 | Coloidal Silica | 4 | 1% | Aluminum Chloride (AlCl$_3$) | 1% | — |
| Ex. 24 | Coloidal Silica | 4 | 1% | Aluminum Chloride (AlCl$_3$) | 1% | Picolinic Acid (200 ppm) |
| Ex. 25 | Coloidal Silica | 4 | 1% | Aluminum Chloride (AlCl$_3$) | 1% | Pipecolic Acid (200 ppm) |
| Ex. 26 | Coloidal Silica | 4 | 1% | Aluminum Chloride (AlCl$_3$) | 1% | Sodium Acetate (200 ppm) + Acetic Acid (500 ppm) |
| Ex. 27 | Coloidal Silica | 4 | 1% | Aluminum Chloride (AlCl$_3$) | 1% | Sodium Sulfate (200 ppm) Sulfuric Acid (500 ppm) |
| Ex. 28 | Coloidal Silica | 4 | 1% | Aluminum Chloride (AlCl$_3$) | 1% | Diethylene glycol (50 ppm) |
| Ex. 29 | Coloidal Silica | 4 | 1% | Aluminum Chloride (AlCl$_3$) | 1% | Triethylene glycol (50 ppm) |

TABLE 14

| Items | Polishing Particles | Slurry pH (Immediately after manufacture) | Slurry pH (after one month) | Polyimide Removal Rate | Non-Uniformity after CMP | Rq after CMP | pKa |
|---|---|---|---|---|---|---|---|
| Comp. Ex. 1 | Coloidal Silica | 4 | 3.92 | 76 Å/min | 30.57% | 0.867 | 3.22 |
| Ex. 23 | Coloidal Silica | 4 | 3.95 | 3684 Å/min | 10.44% | 0.627 | 3.24/4.51/4.61 |
| Ex. 24 | Coloidal Silica | 4 | — | 3557 Å/min | 8.26% | — | 3.24/4.50/4.76 |
| Ex. 25 | Coloidal Silica | 4 | — | 3593 Å/min | 9.37% | — | 3.22/4.52/4.73 |
| Ex. 26 | Coloidal Silica | 4 | 3.97 | 3578 Å/min | — | — | 3.23/4.53/4.80 |
| Ex. 27 | Coloidal Silica | 4 | 3.96 | 3569 Å/min | — | — | 3.24/4.54/4.80 |
| Ex. 28 | Coloidal Silica | 4 | — | 3223 Å/min | — | 0.553 | 3.25/4.52/4.81 |
| Ex. 29 | Coloidal Silica | 4 | — | 3298 Å/min | — | 0.610 | 3.22/4.49/4.74 |

In Example 23, similarly to Comparative Example 1, other additives were not further added to the slurry composition. Nevertheless, in the case of Example 23, compared to Comparative Example 1, there was little change in pH over time, and the flatness and surface roughness were excellent, and the polyimide film removal rate was excellent.

On the other hand, Examples 24 and 25, in which the polishing profile improving agent was added, further improved flatness, and Examples 26 and 27, in which the dispersant was added, showed less change in pH over time, resulting in excellent dispersion stability and storage stability. In the case of Examples 28 and 29 in which the surface quality improving agent was added, the surface roughness was significantly lower, and the surface quality of the film quality after polishing was excellent.

EXAMPLES 30 TO 32, COMPARATIVE EXAMPLE 13

The same procedure as in Example 3 was performed except as otherwise indicated in Table 15 below, and the copper metal film polishing rate and pKa were measured, and the results are shown in Table 15.

TABLE 15

| Items | Polishing Particles | Solids Content | Cu Film Removal Rate | Zeta Potential | pH | pKa | Notes |
| --- | --- | --- | --- | --- | --- | --- | --- |
| Comp. Ex. 13 | Coloidal Silica | 2.32% | 294 Å/min | −2.5 mV | 4 | 3.22 | Silica before reforming |
| Ex. 30 | Coloidal Silica | 2.3% | 1037 Å/min | 46 mV | 4 | 3.23/4.51/4.81 | Silica after reforming |
| Ex. 31 | Coloidal Silica | 2.3% | 1512 Å/min | 46 mV | 4 | 3.23/4.51/4.81 | Silica after reforming + Hydrogen Peroxide 0.5% |
| Ex. 32 | Coloidal Silica | 2.3% | 1812 Å/min | 46 mV | 4 | 3.23/4.51/4.81 | Silica after reforming + Hydrogen Peroxide 0.5% + Fe(NO$_3$)$_3$ 0.0005% |

As shown in Table 15, the copper metal film removal rate of Example 30 was significantly superior to that of Comparative Example 13. In addition, when hydrogen peroxide was further added as an oxidizing agent (Example 31), the copper metal film removal rate was further increased, and when an oxidizing agent and an iron-containing catalyst were further added (Example 32), the copper metal film removal rate was further increased.

Features, structures, effects, etc. exemplified in each of the above-described embodiments may be combined or modified for other embodiments by those of ordinary skill in the art to which the embodiments belong. Accordingly, the contents related to such combinations and modifications should be interpreted as being included in the scope of the present disclosure.

The invention claimed is:

1. Chemical-mechanical polishing (CMP) particles comprising:
    polishing particles; and
    at least one aluminum cluster coated on the surface of each of the polishing particles,
    wherein the number of pKa peaks of the polishing particles coated with the at least one aluminum cluster, obtained by a back titration method, is one or more, and one or more of pKa values of the peaks range from 4.3 to 4.9, and
    wherein the polishing particles coated with the at least one aluminum cluster have a zeta potential of 40 mV or higher.

2. The CMP particles according to claim 1, wherein the number of the peaks is 3.

3. The CMP particles according to claim 2, wherein a peak having the highest pKa value among the three peaks has the greatest peak area.

4. The CMP particles according to claim 1, wherein the polishing particles comprise silica particles.

5. The CMP particles according to claim 1, wherein the at least one aluminum cluster comprises at least one selected from the group consisting of $[Al(OH)]^{2+}$, $[Al(OH)_2]^+$, $[Al_2(OH)_2(H_2O)_8]^{4+}$, $[Al_{13}O_4(OH)_{24}(H_2O)_{12}]^{7+}$, and $[Al_2O_8Al_{28}(OH)_{56}(H_2O)_{26}]^{18+}$.

6. A polishing slurry composition comprising the CMP particles according to claim 1, a pH adjuster, and water.

7. The polishing slurry composition according to claim 6, wherein the CMP particles are present in the slurry composition in an amount of 0.1 wt % to 10 wt %.

8. The polishing slurry composition according to claim 6, further comprising a peroxy group (—O—O—) as an oxidizing agent.

9. The polishing slurry composition according to claim 6, further comprising an iron-containing catalyst.

* * * * *